(12) United States Patent
Tan et al.

(10) Patent No.: US 7,450,408 B2
(45) Date of Patent: Nov. 11, 2008

(54) INTEGRATED CONVERTER HAVING THREE-PHASE POWER FACTOR CORRECTION

(75) Inventors: Jing-Tao Tan, Taoyuan Hsien (TW); Zhi-Qiang Jiang, Taoyuan Hsien (TW); Yang Li, Taoyuan Hsien (TW); Qui-Hua Zhu, Taoyuan Hsien (TW); Jian-Ping Ying, Taoyuan Hsien (TW); Wen-yin Tsai, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 195 days.

(21) Appl. No.: 11/448,617

(22) Filed: Jun. 7, 2006

(65) Prior Publication Data
US 2007/0058401 A1    Mar. 15, 2007

(30) Foreign Application Priority Data
Jul. 26, 2005    (TW) .............................. 94125338 A

(51) Int. Cl.
*H02M 7/5387*    (2007.01)

(52) U.S. Cl. ........................................ 363/132; 363/37
(58) Field of Classification Search .................. 363/17, 363/65–70, 52–53, 86–89, 132, 134, 37; 323/207, 282, 288, 222; 307/52, 86, 71
See application file for complete search history.

(56) References Cited

U.S. PATENT DOCUMENTS 6,856,526 B2 *    2/2005    Elek et al. ..................... 363/86

FOREIGN PATENT DOCUMENTS

| CN | 1533018 | 9/2004 |
|---|---|---|
| CN | 200510091141X | 11/2007 |

* cited by examiner

*Primary Examiner*—Rajnikant B Patel
(74) *Attorney, Agent, or Firm*—Volpe and Koenig, P.C.

(57) ABSTRACT

An integrated converter having three-phase power factor correction is provided. The integrated converter includes two PFC circuits. Two DC/DC converters are controlled and switched by the integrated converter in accordance with a three-phase AC power source so as to convert the AC power source into a DC power source. The use of the elements in the integrated converter is efficient.

12 Claims, 12 Drawing Sheets

INTEGRATED CONVERTER HAVING THREE-PHASE POWER FACTOR CORRECTION

FIELD OF THE INVENTION

The present invention relates to a power inverter, in particular an integrated converter having three-phase power factor correction performed by using semiconductor switches.

BACKGROUND OF THE INVENTION

For the past twenty years, the electronic technology has been developed very fast and applied to the fields of the power, the chemical engineer, and the communication. The electronic devices are mostly operated through the converters and the interface of the power net. The conventional converter is a nonlinear circuit consisted of the diode or silicon controlled rectifier (SCR), which generates lots of current harmonic waves and zero power and thus becomes the pollution of the electronic device to contaminate the power net.

The electronic device has been one of the major sources of the harmonic waves. Currently, one of the major methods for inhibiting the harmonic waves produced by the electric device is an active method. The active method designs a new converter with high efficiency and having the characteristics of a sine input current, a low harmonic wave, and a high power factor, i.e. having the power factor correction function. Therefore, recently, the development of the power factor correction circuit has also been great and become one of the important directions for the field of the electronics study.

The technique of the single-phase power factor correction on the circuit topology and the controlling has become maturer and maturer recently. The power of the three-phase converter is relatively high, so the contamination for the power network is much higher. In the application of the three-phase input voltage, there are already lots of traditional methods for decreasing the total harmonic distortion (THD) of the input current.

First, a common method is a three-phase single-switch power factor correction circuit, which is advantageous in that the number of elements in the circuit is lower and hence the power density thereof is higher. The disadvantage of such circuit is that the three-phase input currents will affect each other, and hence the controlling effect of the THD is not good enough.

Furthermore, another common method is to combine three single-phase power factor correction circuits to control the three-phase input current. In this method, each of the three single-phase power factor correction circuits is independent, so the controlling effect of the THD is satisfactory and the efficiency thereof is higher. The disadvantage of the circuit is that the number of elements in such circuit is higher and thus the system power density thereof is lower.

Please refer to FIG. 1, which shows a circuit diagram of a conventional three-phase four-line power factor correction circuit, which is formed by three single-phase power factor correction circuits.

In the circuit, due to the existence of the middle-line N, the three single-phase power factor correction circuits won't affect each other, i.e. the three-phase voltages A, B, C are operated independently via their own modules. For the voltage of the phase A, when the voltage is positive, the diode D1 is switched on and the switch S1 is chopped. When the switch S1 is switched on, the inductance L1 stores the energy via the way: inductance L1-diode D1-switch S1-middle-line N. When the switch S1 is switched off, the inductance L1 releases the energy via the way: inductance L1-diode D1-diode D7-capacitor C1-middle-line N, and charges the capacitor C1 and adjusts the duty cycle of the switch S1 according to different requirements to make the output voltage achieve the required value.

On the other hand, when the voltage of the phase A is negative, the diode D2 is switched on and the switch S2 is chopped. When the switch S2 is switched on, the inductance L1 stores the energy via the way: middle-line N-switch S2-diode D2-inductance D2. When the switch S2 is switched off, the inductance L1 releases the energy via the way: middle-line N-capacitor C2-diode D8-diode D2-inductance L1, and charges the capacitor C2 and adjusts the duty cycle of the switch S2 appropriately to make the voltage on the capacitor C2 the required value.

As for the respective operating principles of the voltages of the phases B and C, they are the same as that of the voltage of the phase A as described above.

In such conventional circuit, the three single-phase power factor correction circuits do not affect each other, and hence the control method is simpler and the THD of the input current is lower. Besides, if one of the phase voltages fails, the others still can provide power to the load. Therefore, the circuit has the redundancy feature. However, such circuit has the following drawbacks:

(a) the utility rate of the circuit elements is low

For example, when the voltage of the phase A is positive, the switch S2 is not used. Moreover, when the voltage of the phase A is negative, the switch S1 is not used.

(b) the number of elements in the circuit is high

Because the circuit uses too many elements, the production cost therefor is getting higher directly.

In order to overcome the drawbacks in the prior art, an integrated converter having three-phase power factor correction is provided. The particular design in the present invention not only solves the problems described above, but also is easy to be implemented. Thus, the invention has the utility for the industry.

SUMMARY OF THE INVENTION

In accordance with one aspect of the present invention, an integrated converter having three-phase power factor correction with less elements and a high utility rate is provided. The provided converter is formed by only two power factor correction circuits.

In accordance with the present invention, an integrated converter having three-phase power factor correction is provided, which comprises a first power fact correction circuit and a second power fact correction circuit.

The first power fact correction circuit comprises a first bridge converter having a first half bridge with a first middle point connected to a first phase alternating current, and a second half bridge with a second middle point connected to a second phase alternating current; a first inductance set having a first end connected to the first bridge converter and a second end; and a first DC/DC converting device connected to the second end of the first inductance set.

The second power fact correction circuit comprises a second bridge converter having a third half bridge with a third middle point connected to the second phase alternating current and the second middle point of the second half bridge, and a fourth half bridge with a fourth middle point connected to a third phase alternating current; a second inductance set having a first end connected to the second bridge converter and a second end; and a second DC/DC converting device connected to the second end of the second inductance set.

According to the first, second, and third phase AC power source, the integrated converter is formed as a three-phase AC to control and switch the first DC/DC converter and the second DC/DC converter, so as to convert the three phase AC to a DC output.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiment. It is to be noted that the following descriptions of preferred embodiment of this invention are presented herein for purposes of illustration and description only; it is not intended to be exhaustive or to be limited to the precise form disclosed.

Figure 1:
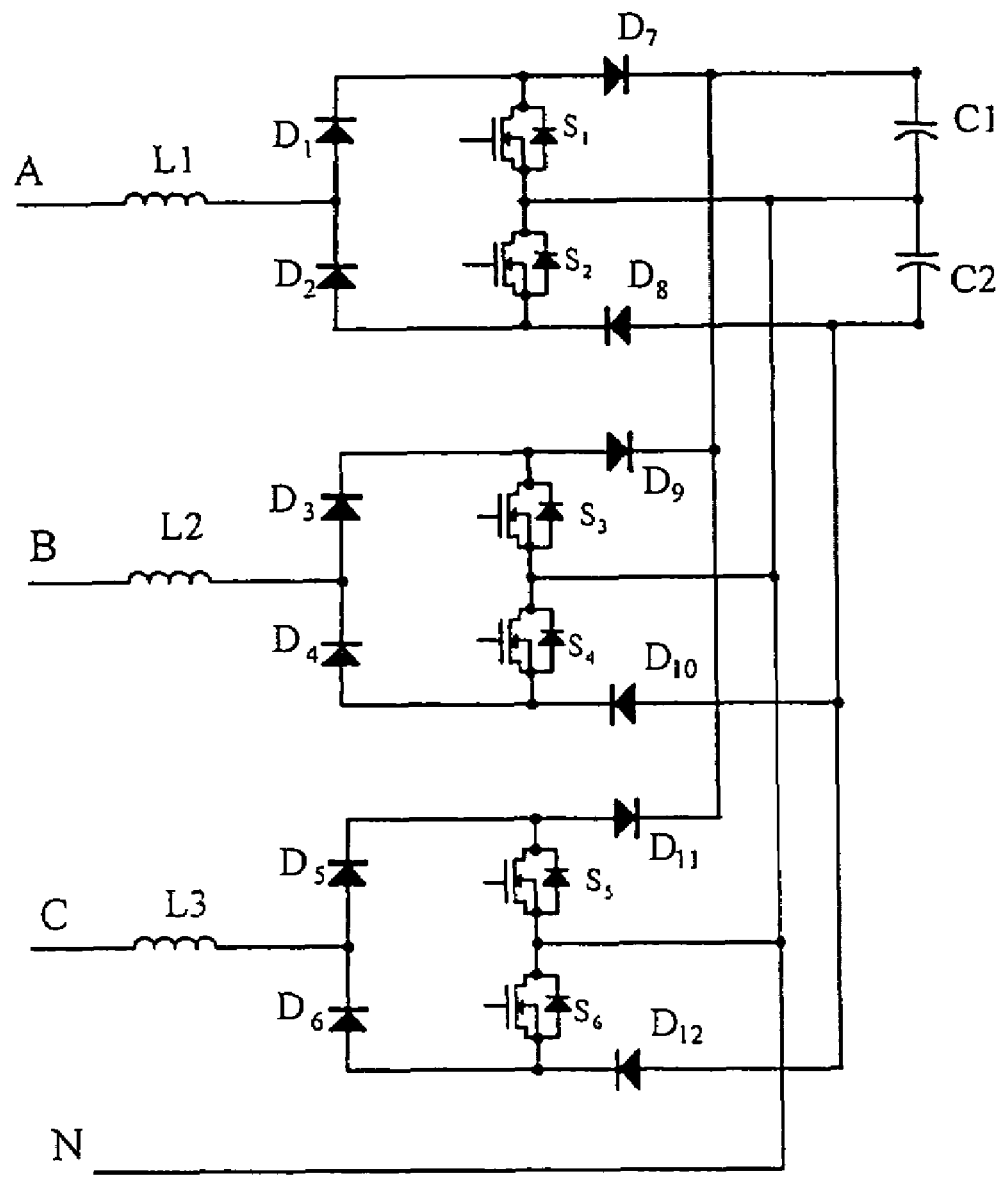
FIG. 1 is a circuit diagram of a conventional three-phase four-line power fact correction circuit.
Figure 2:
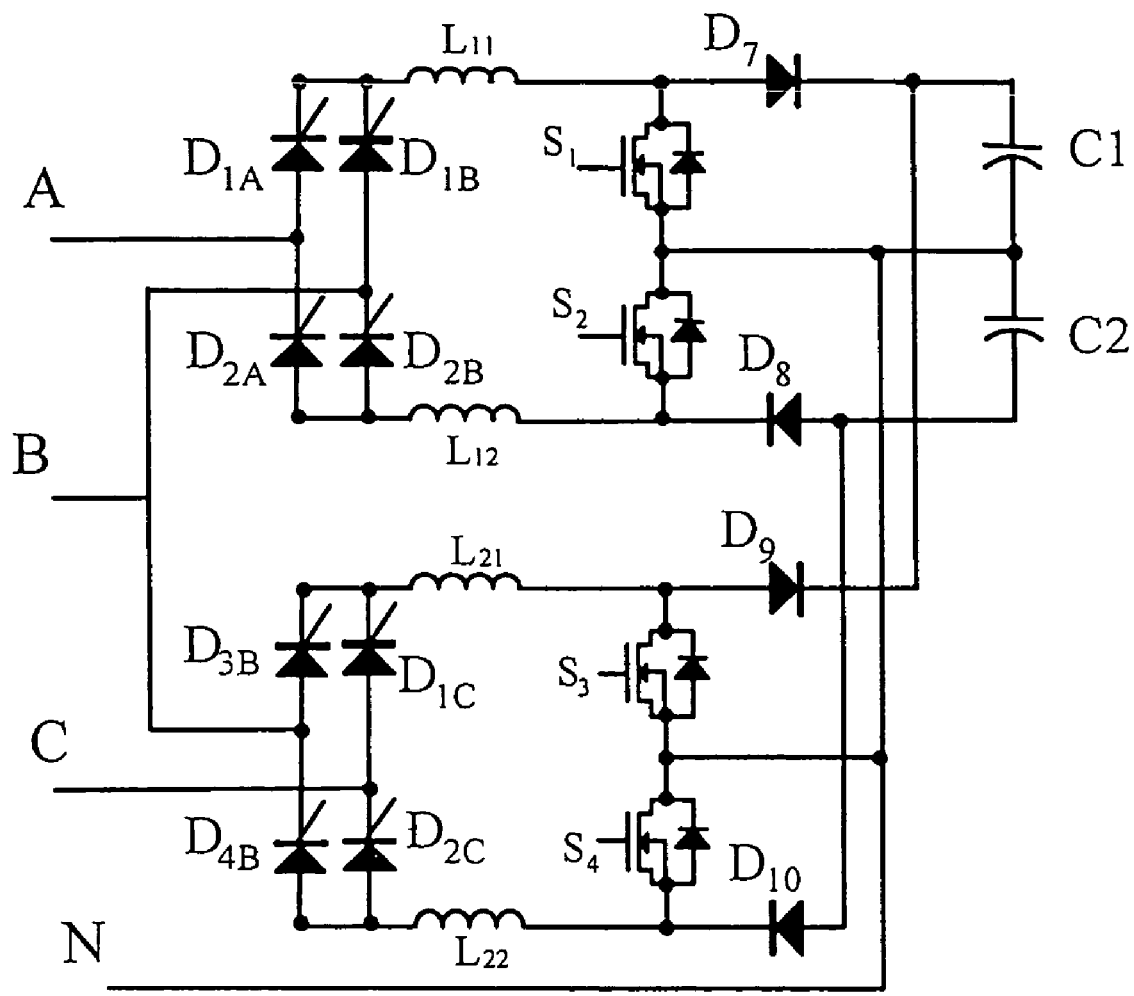
FIG. 2 is a circuit diagram of the integrated converter having the three-phase power factor correction according to a first preferred embodiment of the present invention.

Please refer to FIG. 2, which shows the circuit diagram of the integrated converter having the three-phase power factor correction according to the first preferred embodiment of the present invention. As shown in FIG. 2, the integrated converter is formed by two power factor correction circuits, the first power factor correction circuit and the second power factor correction circuit. The first power factor correction circuit is formed by a first bridge converter, a first inductance set, and a first DC/DC converter, and the second power factor correction circuit has the same structure as that of the first power factor correction circuit.

In the first power factor correction circuit, the first bridge converter has a first half bridge formed by the SCRS, $D_{1A}$ and $D_{2A}$ and having a first middle point connected to the first phase AC A, and a second half bridge formed by the SCRs, $D_{1B}$ and $D_{2B}$ and having a second middle point connected to the second phase AC B. The first inductance set is formed by the inductances, $L_{11}$ and $L_{12}$ and connected between the first bridge converter and the first DC/DC converter. The first DC/DC converter is formed by the switches S1 and S2, the diodes D7 and D8, and the capacitors C1 and C2, wherein the switches S1 and S2 are serially connected at a first connecting node, and the capacitors C1 and C2 are serially connected at a second connecting node. The first connecting node is directly and electrically connected to the second connecting node, and a middle line N of the three-phase AC is electrically connected thereto. The diode D7 is electrically connected to the switch S1 and a first end of the capacitor C1, and the diode D8 is electrically connected to the switch S2 and a second end of the capacitor C2.

Similarly, in the second power factor correction circuit, the second bridge converter has a third half bridge formed by the SCRs, $D_{3B}$ and $D_{4B}$ and having a third middle point connected to the second phase AC B, and a fourth half bridge formed by the SCRs, $D_{1C}$ and $D_{2C}$ and having a fourth middle point connected to the third phase AC C. The second inductance set is formed by the inductances $L_{21}$ and $L_{22}$ and connected to the second bridge converter and the second DC/DC converter. The second DC/DC converter is formed by the switches S3 and S4, the diodes D9 and D10, and the capacitors C1 and C2, wherein the switches S3 and S4 are serially connected at a third connecting node, which is directly and electrically connected to the second connecting node, and a middle line N of the three-phase AC is electrically connected thereto. The diode D9 is electrically connected to the switch S3 and a first end of the capacitor C1, and the diode D10 is electrically connected to the switch S4 and a second end of the capacitor C2.

Figure 3:
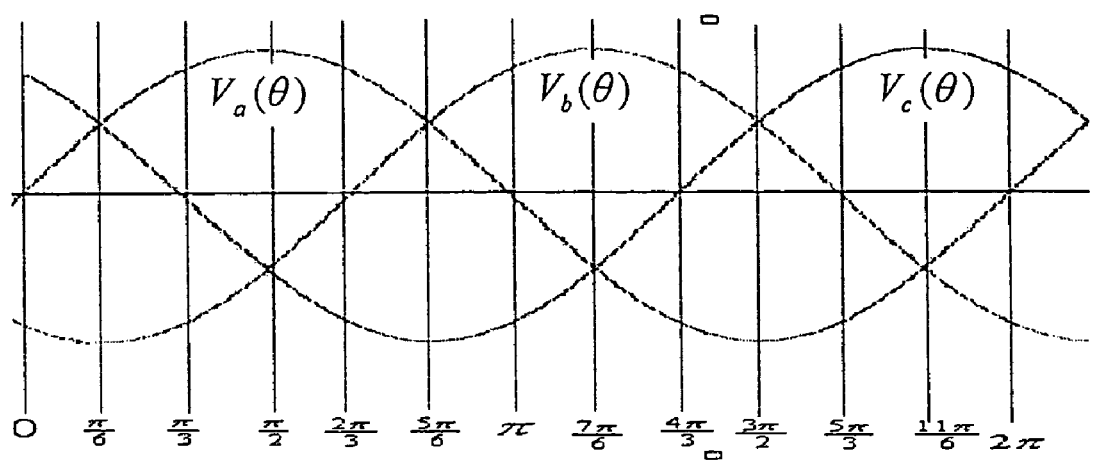
FIG. 3 is a diagram showing the input wave form of the three-phase AC.

Please refer to FIG. 3, which is the diagram showing the wave form of the three-phase input voltage, wherein the $Va(\theta)$, $Vb(\theta)$, and $Vc(\theta)$ respectively represent the wave forms of the three-phase input voltage. The diagram is separated to six working regions: (1) $0 \sim \frac{1}{3}\pi$, (2) $\frac{1}{3}\pi \sim \frac{2}{3}\pi$, (3) $\frac{2}{3}\pi \sim \pi$, (4) $\pi \sim \frac{4}{3}\pi$, (5) $\frac{4}{3}\pi \sim \frac{5}{3}\pi$, and (6) $\frac{5}{3}\pi \sim 2\pi$. The detailed illustrations for the respective operation principles of the six working regions are illustrated below.

Figure 4A:
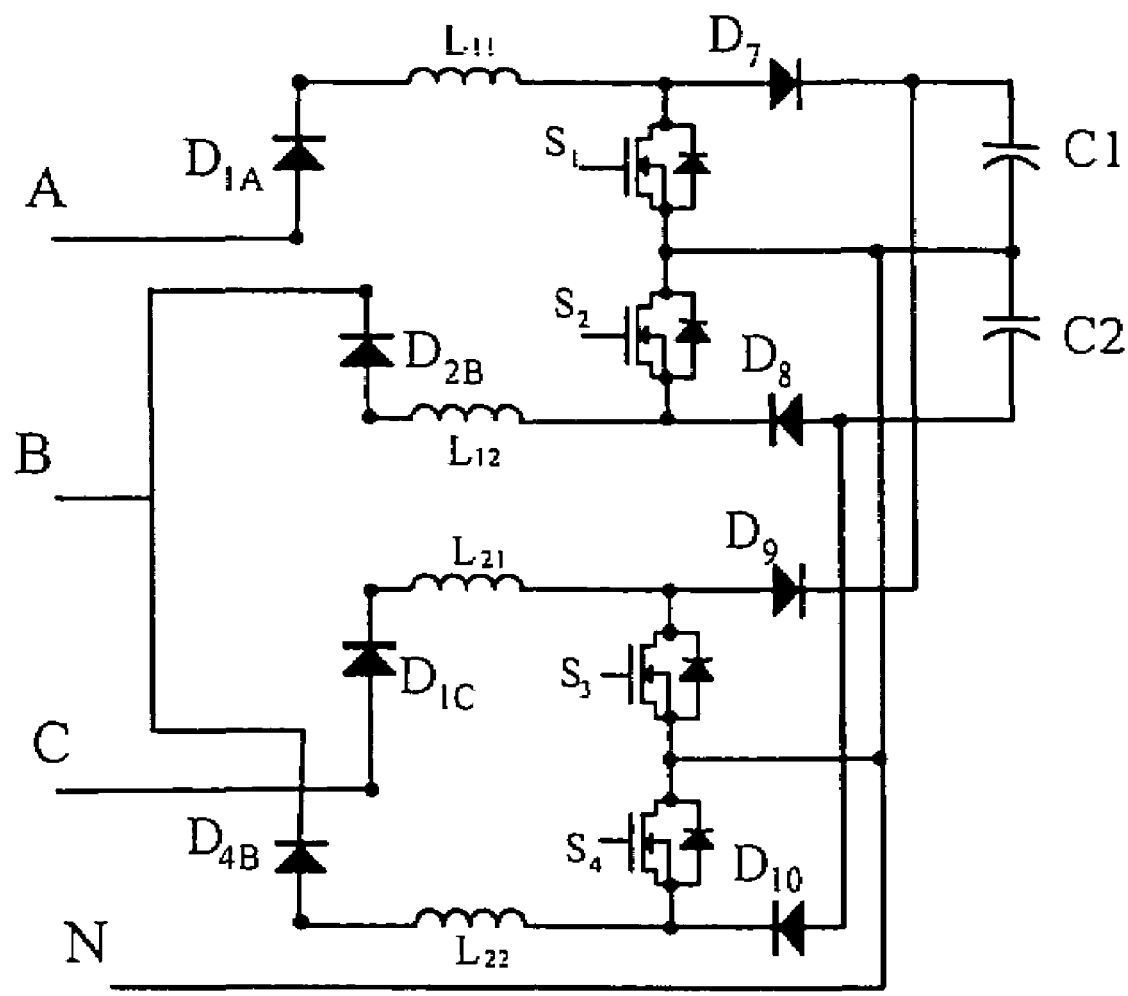
FIGS. 4(a)~4(f) are the respective equivalent circuit diagrams of the three-phase AC under different input wave forms.

(1) $0 \sim \frac{1}{3}\pi$ (the three phase ACs A, B, and C are respectively positive, negative, and positive):

The working mode for the first working region is shown in the equivalent circuit in FIG. 4(a), wherein the SCRs D1A, D2B, D1C, and D4B are switched on. The SCRs are shown as the diodes here, because they are functioning as the diodes. The first phase AC A is positive in the first working region, so the SRC $D_{1A}$ is switched on. The switch S1 chops the first phase AC A, and the inductance $L_{11}$ is used for charging/discharging the first phase AC A.

When the switch S1 is switched on, the first phase AC A charges the inductance $L_{11}$ via the way: the first AC A-SCR $D_{1A}$-inductance $L_{11}$-switch S1-middle line N. When the Switch S1 is switched off, the first phase AC A charges the capacitor C1 via the way: the first phase AC A-SCR $D_{1A}$-inductance $L_{11}$-diode D7-capacitor C1-middle line N. The third phase AC C is also positive in the first working region, so the SCR $D_{1C}$ is switched on. The switch S3 chops the third phase AC C, and the inductance $L_{21}$ is used for charging/discharging the third phase AC C. When the switch S3 is switched on, the third phase AC C charges the inductance $L_{21}$ via the way: the third AC C-SCR $D_{1C}$-inductance $L_{21}$-switch S3-middle line N. When the switch S3 is switched off, the third phase AC C charges the capacitor C1 via the way: the third phase AC C-SCR $D_{1C}$-inductance $L_{21}$-diode D9-capacitor C1-middle line N.

The second phase AC B is negative in the first working region and the switches S2 and S4 do not react to the first phase AC A and the third phase AC C according to the analysis above, so the switches S2 and S4 can chop the second phase AC B, and the inductances $L_{12}$ and $L_{22}$ are used for charging/discharging the second phase AC B. When the switches S2 and S4 are switched on, the second phase AC B charges the inductances $L_{12}$ and $L_{22}$ via the ways: middle line N-switch S2-inductance $L_{12}$-SCR $D_{2B}$-the second phase AC B, and middle line N-switch S4-inductance $L_{22}$-SCR $D_{4B}$-the second phase AC B. when the switches S1 and S2 are switched off, the second phase AC B charges the capacitor C2 via the ways: middle line N-capacitor C2-diode D8-inductance $L_{12}$-SCR $D_{2B}$-the second phase AC B, and middle line N-capacitor C2-diode $D_{10}$-inductance $L_{22}$-SCR $D_{4B}$-the second phase AC.

Figure 4B:
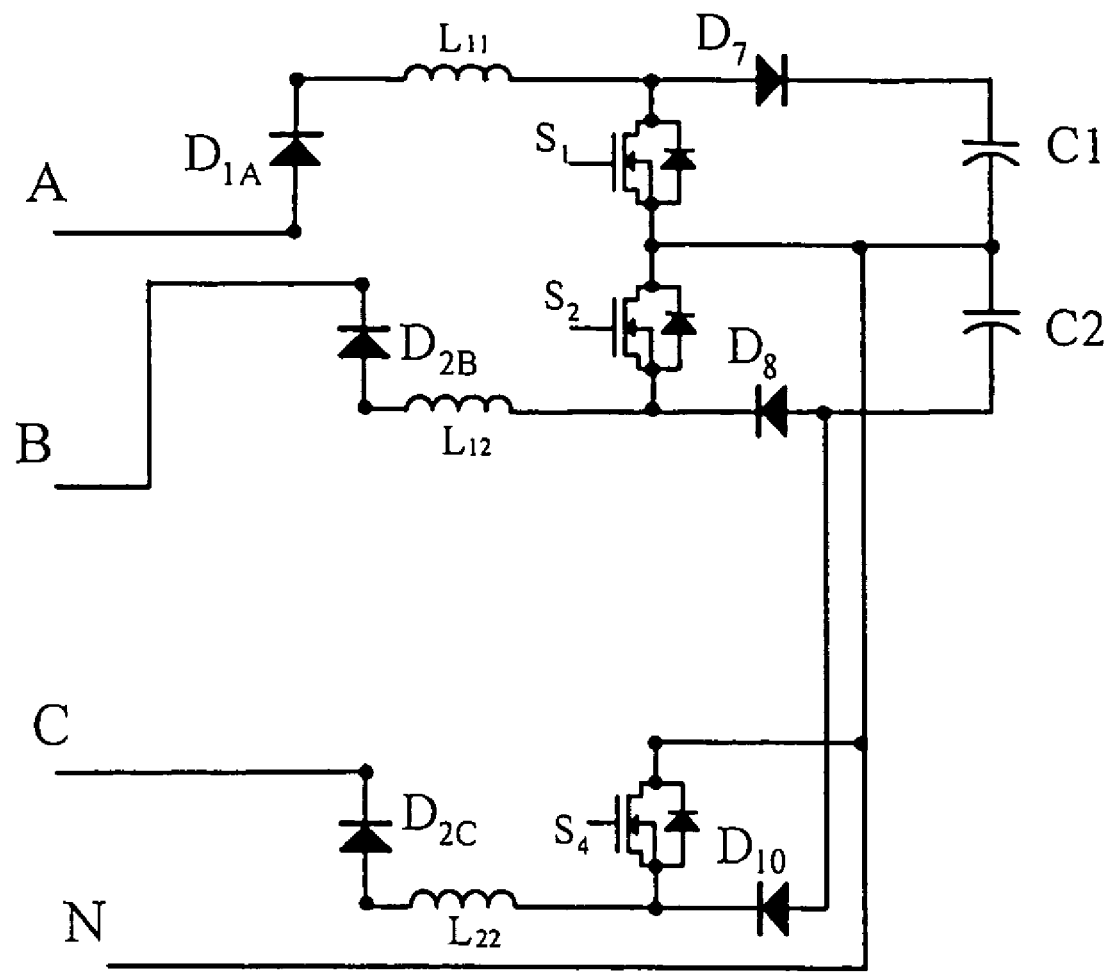

(2) $\frac{1}{3}\pi \sim \frac{2}{3}\pi$ (the three-phase ACs A, B, C are respectively positive, negative, and negative):

The working mode for the second working region is shown in the equivalent circuit in FIG. 4(b), wherein the SCRs D1A, D2B, and D2C are switched on. The first phase AC A is still positive in the second working region, so the SCR $D_{1A}$ is switched on. The switch S1 chops the first phase AC A, and the inductance $L_{11}$ is used for charging/discharging the first phase AC A.

When the switch S1 is switched on, the first phase AC A charges the inductance $L_{11}$ via the way: the first AC A-SCR $D_{1A}$-inductance $L_{11}$-switch S1-middle line N. When the Switch S1 is switched off, the first phase AC A charges the capacitor C1 via the way: the first phase AC A-SCR $D_{1A}$-inductance $L_{11}$-diode D7-capacitor C1-middle line N. The third phase AC C is negative in the second working region, so the SCR $D_{2C}$ is switched on. The switch S4 chops the third phase AC C, and the inductance $L_{22}$ is used for charging/discharging the third phase AC C. When the switch S3 is switched on, the third phase AC C charges the inductance $L_{22}$ via the way: middle line N-switch S4-inductance $L_{22}$-SCR $D_{2C}$-the third phase AC C. When the switch S4 is switched off, the third phase AC C charges the capacitor C2 via the pass way: middle line N-capacitor C2-diode D10-inductance $L_{22}$-SCR $D_{2C}$-the third phase AC C.

The second phase AC B is negative in the second working region and the switch S4 is used for chopping the voltage of the third phase AC C according to the analysis above, so in the second working region, only the switch S2 can be used to chop the second phase AC B, and the inductance $L_{12}$ is used for charging/discharging the second phase AC B. When the switch S2 is switched on, the second phase AC B charges the inductance $L_{12}$ via the way: middle line N-switch S2-inductance $L_{12}$-SCR $D_{2B}$-the second phase AC B. When the switch S2 is switched off, the second phase AC B charges the capacitor C2 via the way: middle line N-capacitor C2-diode D8-inductance $L_{12}$-SCR $D_{2B}$-the second phase AC B.

Figure 4C:
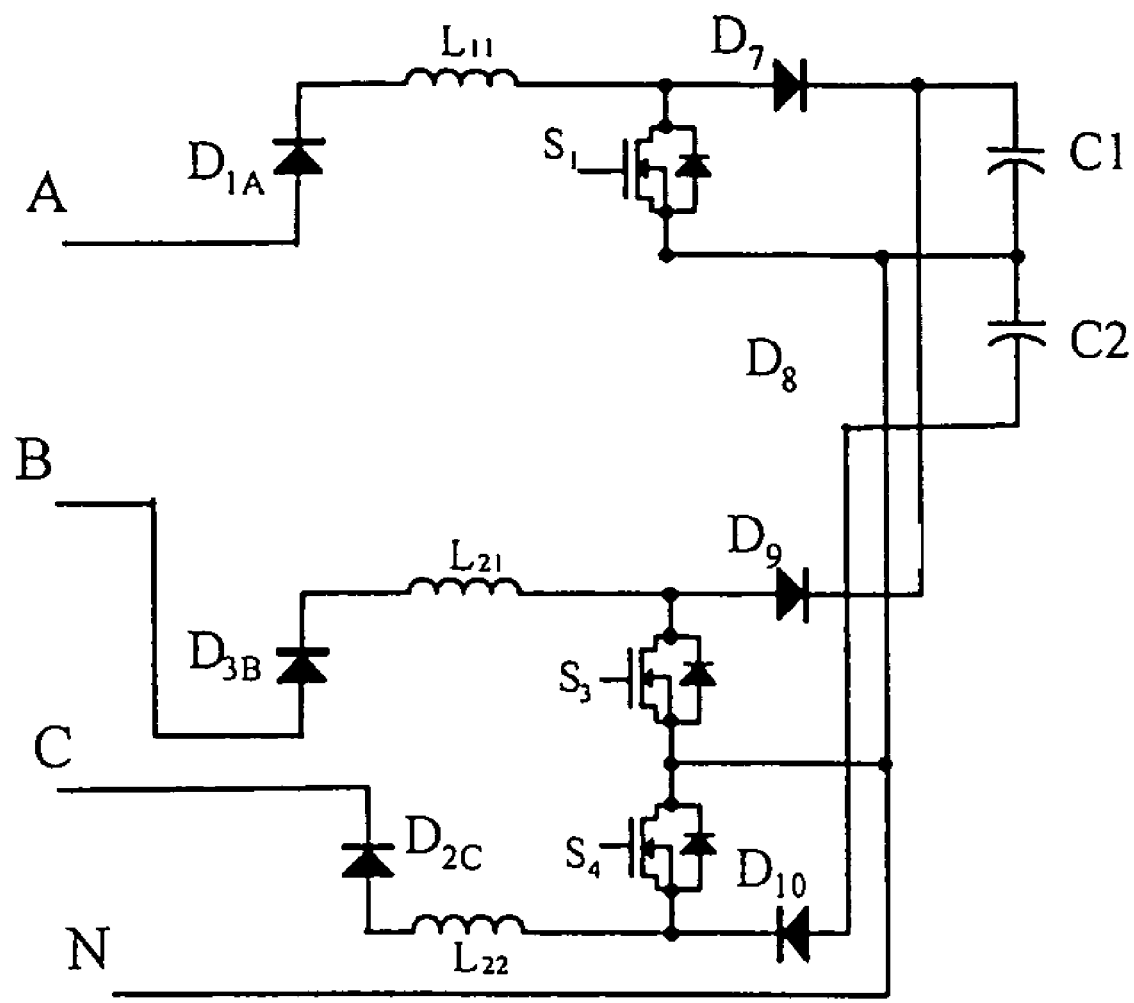

(3) $\frac{2}{3}\pi \sim \pi$ (the three phase ACs A, B, C are respectively positive, positive, and negative):

The working mode for the first working region is shown in the equivalent circuit in FIG. 4(c), wherein the SCRs D1A, D3B, and D2C are switched on. The first phase AC A is still positive in the third working region, so the SRC $D_{1A}$ is switched on. The switch S1 chops the first phase AC A, and the inductance $L_{11}$ is used for charging/discharging the first phase AC A.

When the switch S1 is switched on, the first phase AC A charges the inductance $L_{11}$ via the way: the first AC A-SCR $D_{1A}$-inductance $L_{11}$-switch S1-middle line N. When the Switch S1 is switched off, the first phase AC A charges the capacitor C1 via the way: the first phase AC A-SCR $D_{1A}$-inductance $L_{11}$-diode D7-capacitor C1-middle line N. The third phase AC C is negative in the third working region, so the SCR $D_{2C}$ is switched on. The switch S4 chops the third phase AC c, and the inductance $L_{22}$ is used for charging/discharging the third phase AC C. When the switch S4 is switched on, the third phase AC C charges the inductance $L_{22}$ via the way: middle line N-switch S4-inductance $L_{22}$-SCR $D_{2C}$-the third phase AC C. When switch S4 is switched off, the third phase AC C charges the capacitor C2 via the way: middle line N-capacitor C2-diode D10-inductance $L_{22}$-SCR $D_{2C}$-the third phase AC C.

The second phase AC B is positive in the third working region and the switch S1 is used for chopping the voltage of the first phase AC A according to the analysis above, so in the second working region, only the switches S3 can be used to chop the second phase AC B, and the inductance $L_{21}$ is used for charging/discharging the second phase AC B. When the switch S3 is switched on, the second phase AC B charges the inductance $L_{21}$ via the way: the second AC B-SCR $D_{3B}$-inductance $L_{21}$-switch S3-middle line N. When the Switch S3 is switched off, the second phase AC B charges the capacitor C1 via the way: the second phase AC B-SCR $D_{3B}$-inductance $L_{21}$-diode D9-capacitor C1-middle line N.

Figure 4D:
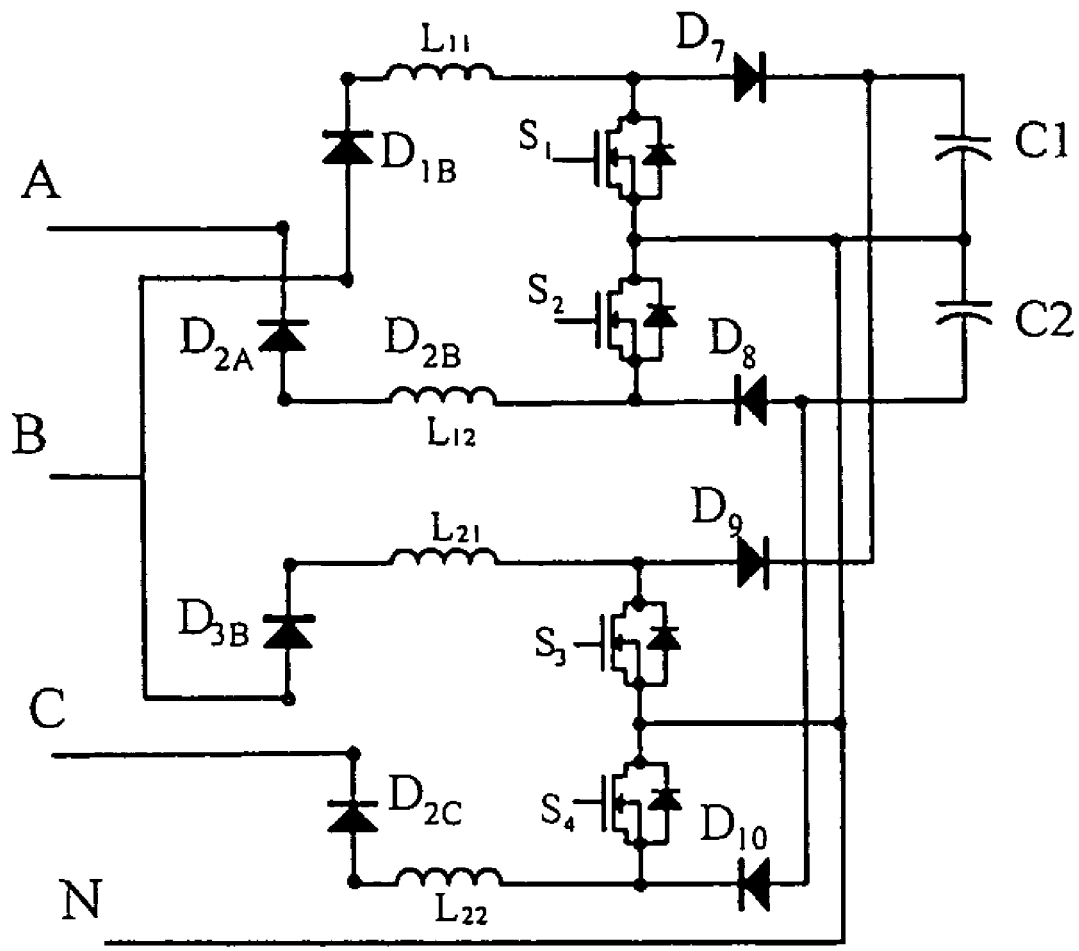

(4) $\pi \sim \frac{4}{3}\pi$ (the three phase ACs A, B, C are respectively negative, positive, and negative):

The working mode for the second working region is shown in the equivalent circuit in FIG. 4(d), wherein the SCRs D1B, D2A, D3B, and D2C are switched on. The first phase AC A is positive in the fourth working region, so the SCR $D_{2A}$ is switched on. The switch S2 chops the first phase AC A, and the inductance $L_{12}$ is used for charging/discharging the first phase AC A.

When the switch S2 is switched on, the first phase AC A charges the inductance $L_{12}$ via the way: middle line N-switch S2-inductance $L_{12}$-SCR $D_{2A}$-the first phase AC A. When the switch S2 is switched off, the first phase AC A charges the capacitor C2 via the way: middle line N-capacitor C2-diode D8-inductance $L_{12}$-SCR $D_{2A}$-the first phase AC A. The third phase AC C is negative in the fourth working region, so the SCR $D_{2C}$ is switched on. The switch S4 chops the third phase AC C, and the inductance $L_{22}$ is used for charging/discharging the third phase AC C. When the switch S4 is switched on, the third phase AC C charges the inductance $L_{22}$ via the way: middle line N-switch S4-inductance $L_{22}$-SCR $D_{2C}$-the third phase AC C. When switch S4 is switched off, the third phase AC C charges the capacitor C2 via the way: middle line N-capacitor C2-diode D10-inductance $L_{22}$-SCR $D_{2C}$-the third phase AC C.

The second phase AC B is positive in the fourth working region and the switches S1 and S3 do not react to the first phase AC A and the third phase AC C according to the analysis above, so in the fourth working region, the switches S1 and S3 are used to chop the second phase AC B, and the inductances $L_{11}$ and $L_{21}$ are used for charging/discharging the second phase AC B. When the switches S1 and S3 are switched on, the second phase AC B charges the inductances $L_{11}$ and $L_{21}$ via the ways: the second phase AC B-SCR $D_{1B}$-inductance $L_{11}$-switch S1-middle line N, and the second AC B-SCR $D_{3B}$-inductance $L_{21}$-switch S3-middle line N. When the switches S1 and S3 are switched off, the second phase AC B charges the capacitor C1 via the ways: the second phase AC B-SCR $D_{1B}$-inductance $L_{11}$-diode D7-capacity C1-middle line N, and the second phase AC B-SCR $D_{3B}$-inductance $L_{21}$-diode D9-capacity C1-middle line N.

Figure 4E:
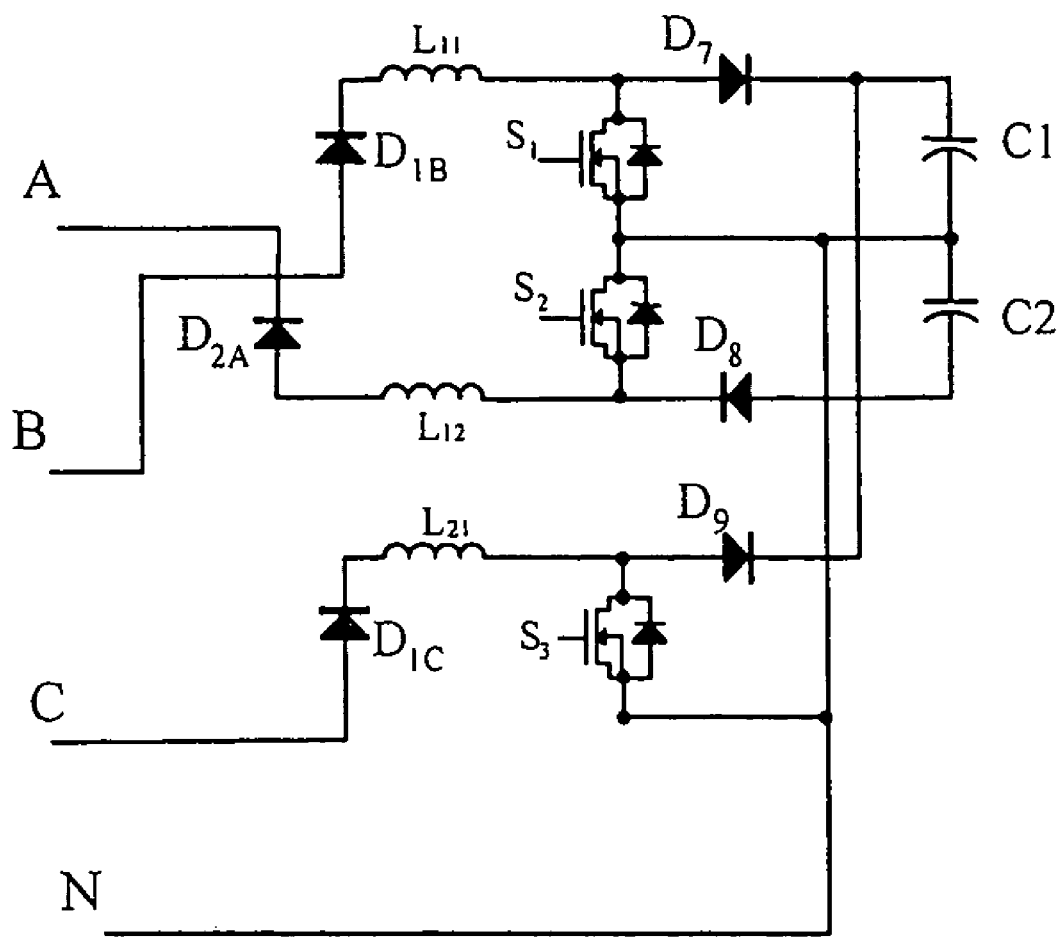

(5) $\frac{4}{3}\pi \sim \frac{5}{3}\pi$ (the three phase ACs A, B, C are respectively negative, positive, and positive):

The working mode for the fifth working region is shown in the equivalent circuit in FIG. 4(e), wherein the SCRs D1B, $D_{2A}$, and D1C are switched on. The first phase AC A is negative in the fifth working region, so the SCR $D_{2A}$ is switched on. The switch S2 chops the first phase AC A, and the inductance $L_{12}$ is used for charging/discharging the first phase AC A.

When the switch S2 is switched on, the first phase AC A charges the inductance $L_{12}$ via the way: middle line N-switch S2-inductance $L_{12}$-SCR $D_{2A}$-the first phase AC A. When switch S2 is switched off, the first phase AC A charges the capacitor C2 via the way: middle line N-capacitor C2-diode D8-inductance $L_{12}$-SCR $D_{2A}$-the first phase AC A. The third phase AC C is also positive in the fifth working region, so the SCR $D_{1C}$ is switched on. The switch S3 chops the third phase AC C, and the inductance $L_{21}$ is used for charging/discharging the third phase AC C. When the switch S3 is switched on, the third phase AC C charges the inductance $L_{21}$ via the way: the third AC C-SCR $D_{1C}$-inductance $L_{21}$-switch S3-middle line N. When switch S3 is switched off, the third phase AC C charges the capacitor C1 via the way: the third phase AC C-SCR $D_{1C}$-inductance $L_{21}$-diode D9-capacitor C1-middle line N.

The second phase AC B is positive in the third working region and the switch S3 is used for chopping the voltage of the third phase AC C according to the analysis above, so in the second working region, only the switch S1 is used to chop the second phase AC B, and the inductance $L_{11}$ is used for charging/discharging the second phase AC B. When the switch S1 is switched on, the second phase AC B charges the inductance $L_{11}$ via the way: the second AC B-SCR $D_{1B}$-inductance $L_{11}$-switch S1-middle line N. When the Switch S1 is switched off, the second phase AC B charges the capacitor C1 via the way: the second phase AC B-SCR $D_{1B}$-inductance $L_{11}$-diode D7-capacitor C1-middle line N.

Figure 4F:
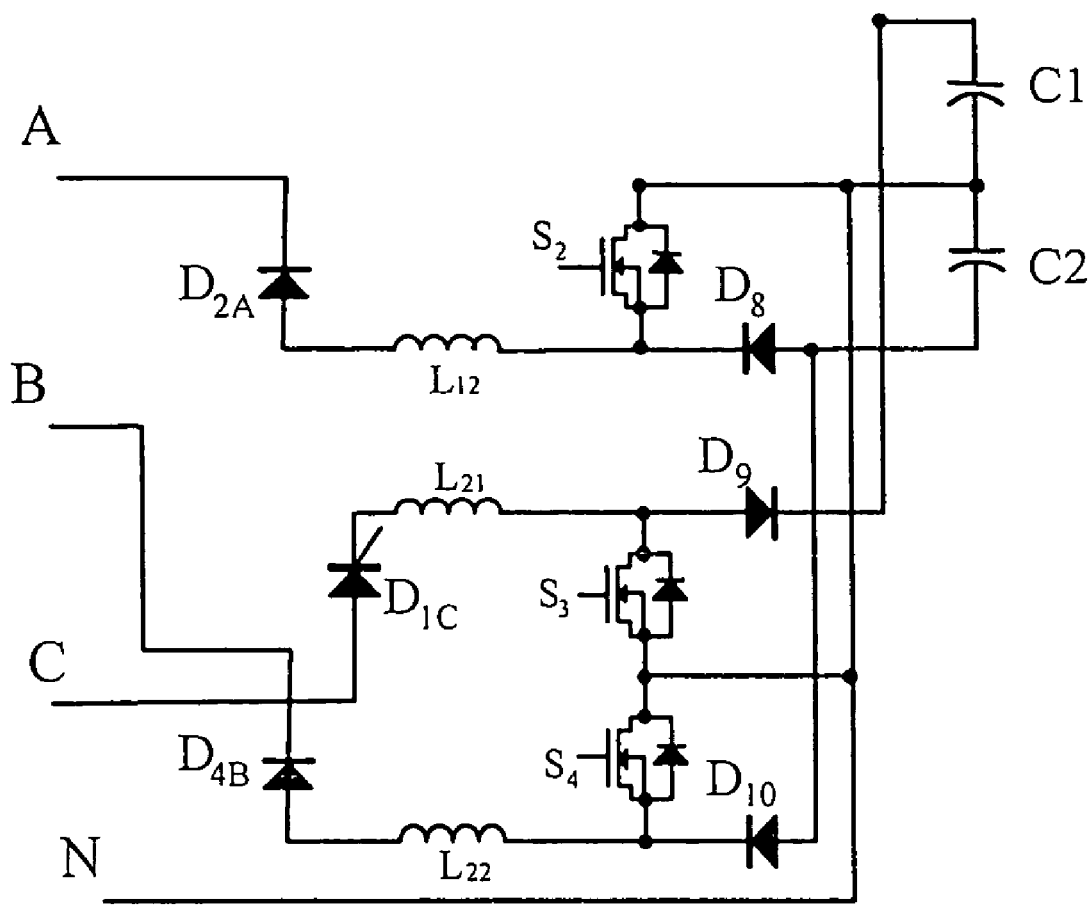

(6) $5/3\pi\sim2\pi$ (the three phase ACs A, B, C are respectively negative, negative, and positive):

The working mode for the first working region is shown in the equivalent circuit in FIG. 4(f), wherein the SCRs D1C, D2A, and D4B are switched on. The first phase AC A is negative in the sixth working region, so the SRC $D_{2A}$ is switched on. The switch S2 chops the first phase AC A, and the inductance $L_{12}$ is used for charging/discharging the first phase AC A.

When the switch S2 is switched on, the first phase AC A charges the inductance $L_{12}$ via the way: middle line N-switch S2-inductance $L_{12}$-SCR $D_{2A}$-the first phase AC A. When the switch S2 is switched off, the first phase AC A charges the capacitor C2 via the way: middle line N-capacitor C2-diode D8-inductance $L_{12}$-SCR $D_{2A}$-the first phase AC A. The third phase AC C is positive in the sixth working region, so the SCR $D_{1C}$ is switched on. The switch S3 chops the third phase AC C, and the inductance $L_{21}$ is used for charging/discharging the third phase AC C. When the switch S3 is switched on, the third phase AC C charges the inductance $L_{21}$ via the way: the third AC C-SCR $D_{1C}$-inductance $L_{21}$-switch S3-middle line N. When the switch S3 is switched off, the third phase AC C charges the capacitor C1 via the way: the third phase AC C-SCR $D_{1C}$-inductance $L_{21}$-diode D9-capacitor C1-middle line N.

The second phase AC B is negative in the sixth working region and the switch S2 is used for chopping the first phase AC A according to the analysis above, so only the switch S4 can be used to chop the second phase AC B, and the inductance $L_{22}$ is used for charging/discharging the second phase AC B. When the switch S4 is switched on, the second phase AC B charges the inductance $L_{22}$ via the way: middle line N-switch S4-inductance $L_{22}$-SCR $D_{4B}$-the second phase AC B. When the switch S4 is switched off, the second phase AC B charges the capacitor C2 via the way: middle line N-capacitor C2-diode $D_{10}$-inductance $L_{22}$-SCR $D_{4B}$-the second phase AC.

From the analysis described above, it is apparent that the present invention features a three-phase power factor correction function, a low THD, and a lower number of elements used and a higher element utility rate.

Compared to the conventional converter with three-phase power factor correction, the present invention uses only two single-phase power factor correction circuits to achieve the same function, which not only reduces the amount of the elements used and raises the element utility rate, but also increases the power density of the system and reduces the production cost therefor.

Figure 5:
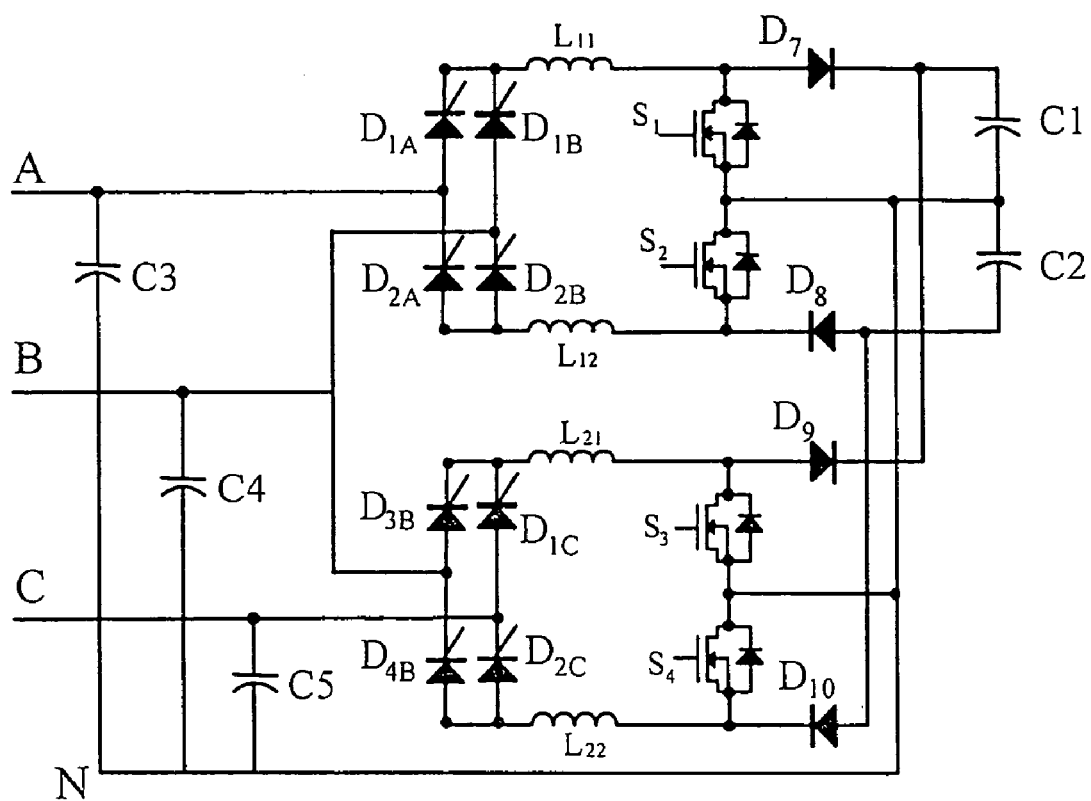
FIG. 5 is a circuit diagram of the integrated converter having the three-phase power factor correction according to a second preferred embodiment of the present invention.

Excepting the configuration in FIG. 2, the present invention also has other embodiments. Please refer to FIG. 5, which shows the circuit diagram of the integrated converter having the three-phase power factor according to the second preferred embodiment of the present invention. The integrated converter in FIG. 5 is different from that in FIG. 2 which includes a three-phase voltage source with three phases and four lines. In practice, if the three-phase voltage source is the one with three phases and three lines, the present invention can also form the floating middle point at the input terminal of the circuit in FIG. 2 by using three capacitors, C3, C4, and C5, which are connected in a Y-shape, so as to change the three phases, three lines form into the three phases, four lines form, wherein N is the middle point.

Besides, when the circuit in FIG. 2 is used in the UPS, the battery set should be additionally disposed. The following are two examples for the battery and the battery set disposition method.

Figure 6:
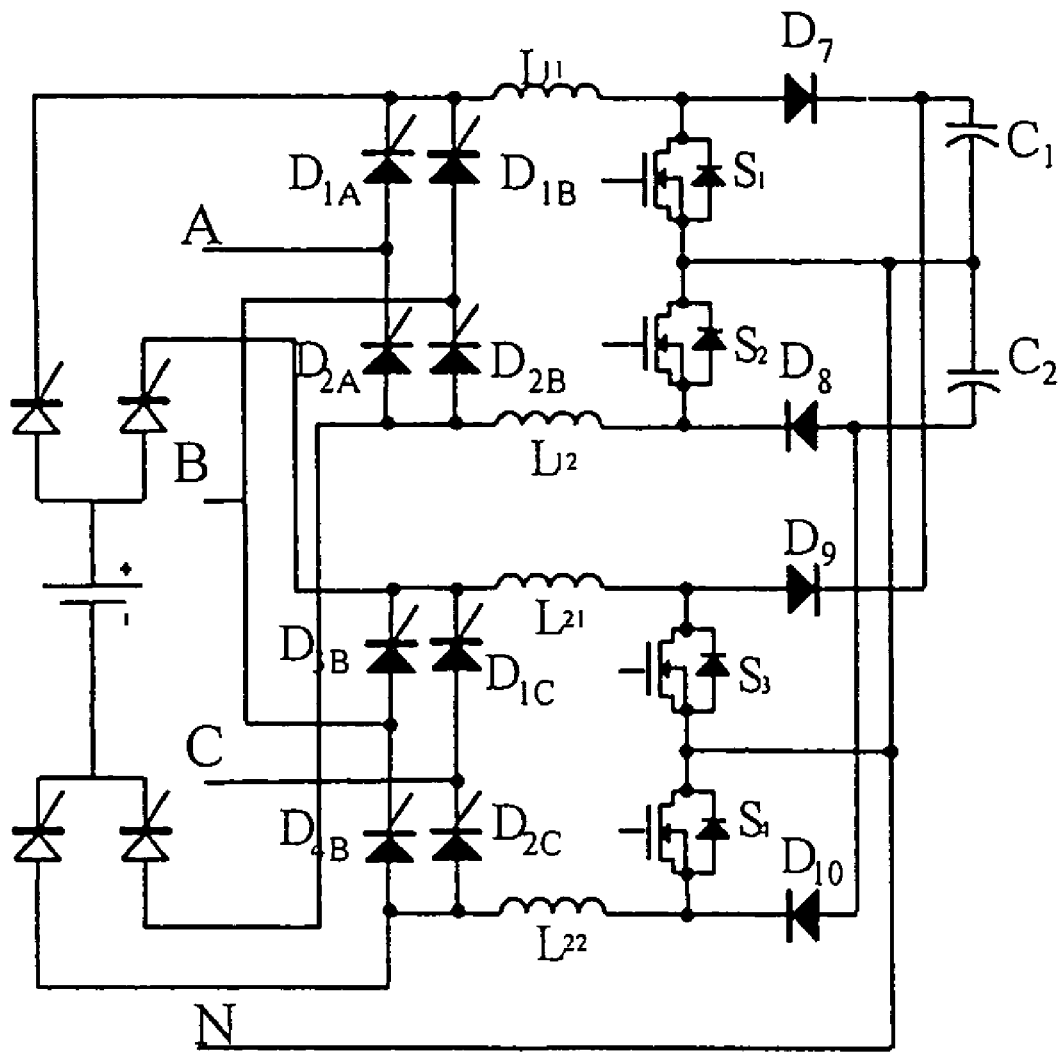
FIG. 6 is a circuit diagram of the integrated converter having the three-phase power factor correction according to a third preferred embodiment of the present invention.

Please refer to FIG. 6, which shows the circuit diagram of the integrated converter having the three-phase power factor correction according to the third preferable embodiment of the present invention. In this embodiment, the positive electrode of the battery is connected to the first end of the first bridge converter and the second end of the second bridge converter via the SCR, and the negative electrode of the battery is connected to the third end of the first bridge converter and the fourth end of the second bridge converter via the SCR. The operation method is to use the battery to provide the power to the two power factor correction circuits in the positive/negative half cycles respectively.

Figure 7:
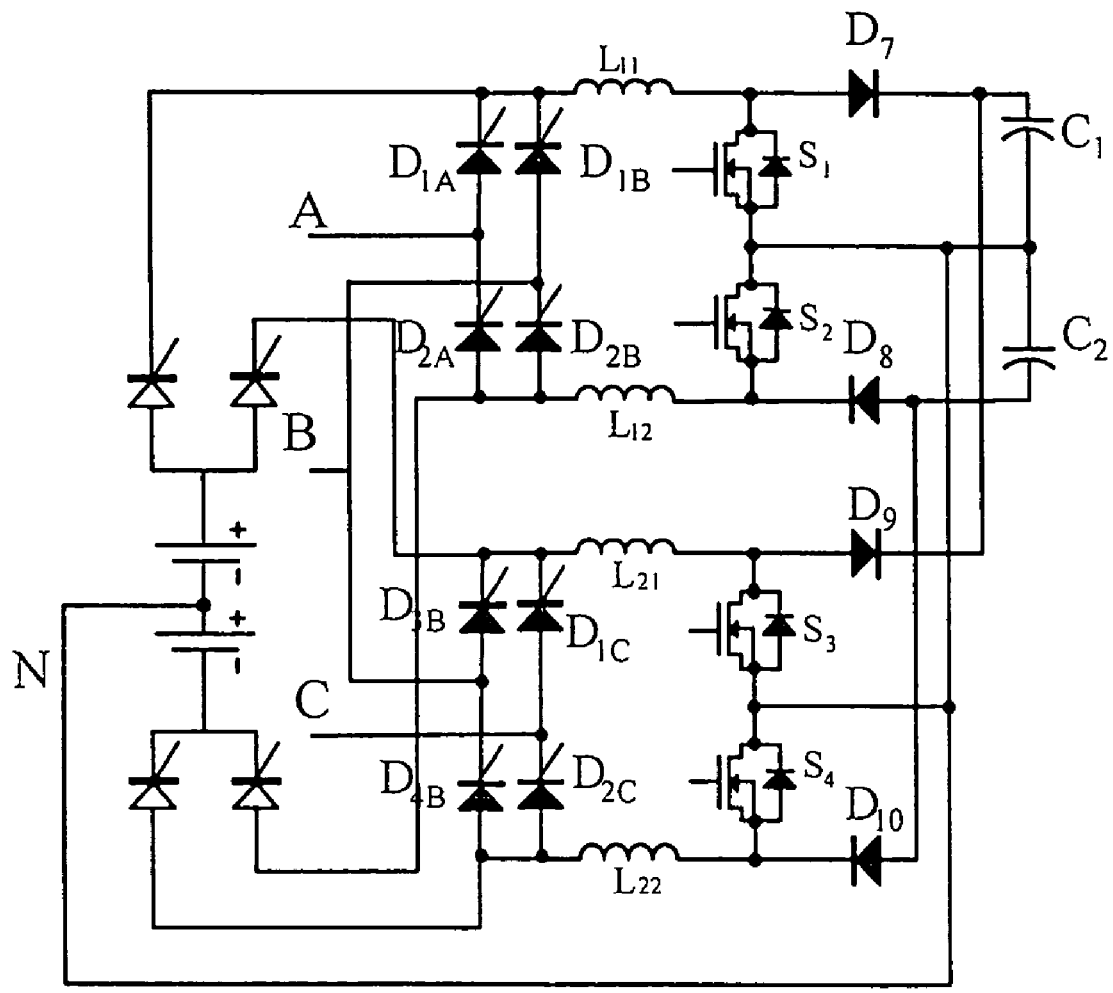
FIG. 7 is a circuit diagram of the integrated converter having the three-phase power factor correction according to a fourth preferred embodiment of the present invention.

Please refer to FIG. 7, which shows the circuit diagram of the integrated converter having the three-phase power factor correction according to the fourth preferable embodiment of the present invention. In this embodiment, two batteries are additionally disposed, wherein the positive electrode of the first battery is connected to the first end of the first bridge converter and the second end of the second bridge converter via the SCR, and the negative electrode of the second battery is connected to the third end of the first bridge converter and the fourth end of the second bridge converter. The middle line is connected between the two batteries. The operation method is to use the two batteries to provide the power to the two power factor correction circuits in the positive/negative half cycles respectively.

It is to be noted that in the respective integrated converters having three-phase power factor correction of the four embodiments illustrated in the present invention (FIGS. 2, 5, 6, and 7), the inductances L11, L12, L21, and L22 are connected downstream to each bridge converter. However, the inductances can also be connected upstream to each bridge converter, i.e. at the respective input ends of the three phase ACs A, B, and C.

In conclusion, the present invention provides an integrated converter having three-phase power factor correction, which has a lower number of elements used as well as a higher element utility rate and is formed by only two power factor correction circuits.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An integrated converter having a three-phase power factor correction, comprising:
a first power factor correction circuit comprising:
a first bridge converter having a first half bridge with a first middle point connected to a first phase alternating current voltage, and a second half bridge with a second middle point connected to a second phase alternating current voltage, wherein the second half bridge is switched off while a polarity of the first phase AC voltage is the same as that of the second phase AC voltage;
a first inductance set connected to the first bridge converter; and
a first DC/DC converting device connected to the first inductance set; and
a second power factor correction circuit comprising:
a second bridge converter having a third half bridge with a third middle point connected to the second phase alternating current voltage and the second middle point of the second half bridge, and a fourth half bridge with a fourth middle point connected to a third phase alternating current voltage, wherein the third half bridge is switched off while the polarity of the second phase AC voltage is the same as that of the third phase AC voltage;
a second inductance set connected to the second bridge converter; and
a second DC/DC converting device connected to the second inductance set,
wherein a three-phase AC voltage is formed by the first, second and third phase AC voltages, and the three-phase AC voltage is transformed to a DC output voltage by the first DC/DC converting device and the second DC/DC converting device.

2. The integrated converter as claimed in claim 1, wherein the respective first half bridge, the second half bridge, the third half bridge and the fourth half bridge are formed by two serially-connected Silicon Controlled Rectifiers (SCR).

3. The integrated converter as claimed in claim 1, wherein the first DC/DC converting device comprises:
a fifth half bridge comprising a first switch, a first capacitor and a first diode electrically connected to the first switch and the first capacitor; and
a sixth half bridge comprising a second switch electrically connected to the first switch in series, a second capacitor electrically connected to the first capacitor in series, and a second diode electrically connected to the second switch and the second capacitor;
wherein the three-phase AC voltage further has a middle line voltage, and a first connecting node of the first and second switches is electrically connected to a second connecting node of the first and second capacitors, and the middle line voltage of the three-phase AC voltage.

4. The integrated converter as claimed in claim 3, wherein the second DC/DC converting device comprises:
a seventh half bridge comprising a third switch, a third diode and the first capacitor and a third diode electrically connected to the third switch and the first capacitor; and
an eighth half bridge comprising a fourth switch electrically connected to the third switch, the second capacitor and a fourth diode electrically connected to the fourth switch and the second capacitor,
wherein a third connecting node of the third and fourth switches is electrically connected to the second connecting node of the first and second capacitors and the middle line voltage of the three-phase AC voltage.

5. The integrated converter as claimed in claim 3, wherein the respectively first, second and third phase AC voltages are connected to the middle line voltage through a third, a fourth and a fifth capacitors.

6. The integrated converter as claimed in claim 3 further comprising two batteries, wherein a positive electrode of one of the two batteries is connected to both of a first end of the first bridge converter and a first end of the second bridge converter via a first Silicon Controlled Rectifier respectively, a negative electrode of the other battery is connected to both of a second end of the first bridge converter and a second end of the second bridge converter via a second Silicon Controlled Rectifier, and a connecting node of the two batteries is connected to the middle line.

7. The integrated converter as claimed in claim 1 further comprising a battery with a positive electrode connected to both of a first end of the first bridge converter and a first end of the second bridge converter via a first Silicon Controlled Rectifier, and a negative electrode connected to both of a second end of the first bridge converter and a second end of the second bridge converter via a second Silicon Controlled Rectifier.

8. A three-phase power factor correction circuit including at least one integrated converter, comprising:
a bridge converter having a first half bridge with a first middle point connected to a first phase AC voltage, and a second half bridge with a second middle point connected to a second phase AC voltage, wherein the second half bridge is switched off while a polarity of the first phase AC voltage is the same as that of the second phase AC voltage;
a first output terminal connected to the bridge converter and a first power factor correction module comprising at least a first DC output terminal and a middle line; and
a second output terminal connected to the bridge converter and a second power factor correction module comprising at least a second DC output terminal and the middle line,
wherein, in a specific period, a first phase current having a first corrected power factor is outputted from the first DC output terminal, a second phase current having a second corrected power factor is outputted from the second DC output terminal, and a polarity of the first phase current is opposing to that of the second phase current.

9. The three-phase power factor correction circuit as claimed in claim 8, wherein the bridge converter comprises a plurality of switches.

10. The three-phase power factor correction circuit as claimed in claim 9, wherein the plurality of switches are Silicon Controlled Rectifiers.

11. The three-phase power factor correction circuit as claimed in claim 8, further comprising a PFC power converter correcting the second and a third phase AC voltages.

12. The three-phase power factor correction circuit as claimed in claim 11, wherein the PFC power converter is said integrated converter.

* * * * *